United States Patent
Maffezoni

(10) Patent No.: US 7,024,497 B1
(45) Date of Patent: Apr. 4, 2006

(54) METHODS FOR ACCESSING REMOTELY LOCATED DEVICES

(75) Inventor: Guido Maffezoni, San Jose, CA (US)

(73) Assignee: Adaptec, Inc., Milpitas, CA (US)

( * ) Notice: Subject to any disclaimer, the term of this patent is extended or adjusted under 35 U.S.C. 154(b) by 646 days.

(21) Appl. No.: 09/656,533

(22) Filed: Sep. 7, 2000

(51) Int. Cl.
*G06F 15/16* (2006.01)

(52) U.S. Cl. ........................... 710/36; 709/219
(58) Field of Classification Search ............... 709/219, 709/203, 208, 200, 202; 710/36
See application file for complete search history.

(56) References Cited

U.S. PATENT DOCUMENTS

| | | | |
|---|---|---|---|
| 5,721,880 A * | 2/1998 | McNeill et al. ............... | 703/25 |
| 5,991,813 A * | 11/1999 | Zarrow ........................ | 709/236 |
| 6,374,308 B1 * | 4/2002 | Kempf et al. ............... | 709/316 |
| 6,463,459 B1 * | 10/2002 | Orr et al. ..................... | 709/203 |
| 6,560,641 B1 * | 5/2003 | Powderly et al. .......... | 709/219 |
| 6,615,166 B1 * | 9/2003 | Guheen et al. ............. | 703/27 |
| 6,675,193 B1 * | 1/2004 | Slavin et al. ............... | 709/203 |
| 6,691,154 B1 * | 2/2004 | Zhu et al. ................... | 709/204 |
| 6,732,067 B1 * | 5/2004 | Powderly ..................... | 703/24 |
| 2003/0069874 A1 * | 4/2003 | Hertzog et al. ............ | 707/1 |
| 2003/0177170 A1 * | 9/2003 | Glass ........................... | 709/203 |

OTHER PUBLICATIONS

Multitiered Distributed Systems and the Web are CHanging the Face of Middleware as We Know it—Next Generation Middleware—by David S. Linthicum, http://64.233.161.104/search?q=cache:d8DbsnGfV4oJ:www.dbmsmag.com/9709d14.html+dcom+enabled+link&hl=en.*

* cited by examiner

*Primary Examiner*—Jeffrey Pwu
(74) *Attorney, Agent, or Firm*—Martine Penilla & Gencarella, LLP

(57) ABSTRACT

A method for enabling access to resources connected to client nodes of a network is provided. The method includes establishing communication between a local client and a remote client using SCSI commands. The local client provides a remote client identification code and a connection password to the remote client over a DCOM enabled link. The communication between the local client and the remote client is established when the remote client confirms the remote client identification code and the password. The method then determines if adapters are connected to the remote client. If the method determines that adapters are connected to the remote client, a connection is established with a selected adapter and the selected adapter is then connected with the local client. The selected adapter is configured to appear on a graphical user interface (GUI) of the local client as if the selected adapter of the remote client were physically connected to the local client. Thus, a user may double click on an icon representing the selected adapter on the GUI of the local client in order to gain access to the selected adapter.

14 Claims, 5 Drawing Sheets

METHODS FOR ACCESSING REMOTELY LOCATED DEVICES

BACKGROUND OF THE INVENTION

1. Field of the Invention

This invention relates generally to communications between clients on a network, and more particularly to methods for accessing devices connected to a remotely located client on a network.

2. Description of the Related Art

Today's computers are moving towards becoming more interactive with other computers in a networking environment. This includes the ability for computers to communicate with other computers on a given network. As computers, or clients, communicate with one another, they are able to access devices connected to other clients. These devices include small computer system interface (SCSI) hard drives, IDE hard drives, SCSI or IDE optical disc drives (e.g., CDs, CD-Rs, CD-R/W, and DVDs), and other peripheral devices.

In order to access peripheral devices and data stored on the peripheral device, it is necessary to use a transfer protocol to connect between two nodes. Various transfer protocols, such as transmission control protocol and internet protocol (TCP/IP), file transfer protocol (FTP) and hyper text transfer protocol (HTTP) are implemented to access peripheral devices and transfer data over a network between nodes. The file transfer and hyper text transfer protocols contain various sets of defined rules which govern the exchange of data between nodes connected to a network. The file transfer and hypertext transfer protocols also use the transmission control and internet protocol to transfer data between nodes connected to a network.

When data is transferred using TCP/IP, the data is divided into individual packets which contain "chunks" of information which allow for an efficient size for routing within the TCP layer. The packets of information are then routed through a network to their final destination, where the information is reassembled by a TCP at the receiving end. Often times, when a user desires to send information using TCP/IP, the user must first compress the information into a zip or gzip format to ease the ability to transfer the information to another client. In addition, if a user sends data via email or a similar function, the user must place the information into a file format, such as *.txt or *.pdf format and send the file as an attachment to the email or a similar function.

Typically, the data being sent from one client (remote client) to another client (local client) is stored on a device which is connected to the remote client. Therefore, in order for the local client to access data stored on the device connected to the remote client, a user at the remote client must send the information to the local client using the above described protocols. A user at the local client is precluded from directly accessing data stored on a device connected to the remote client as if the device connected to the remote client were also connected to the local client. Thus, the above mentioned protocols must be used to access data, which is less efficient because a user at a remote client must physically send data stored on a device connected to the remote client to the waiting local client.

In view of the foregoing, there is a need to transfer information with a more efficient and manageable method which allows a first user on a client connected to a network to access peripheral devices attached to another client also connected to the network.

SUMMARY OF THE INVENTION

Broadly speaking, the present invention fills the aforementioned needs by providing methods and apparatus for allowing a logical connection between users on a network. It should be appreciated that the present invention can be implemented in numerous ways, including as a process, an apparatus, a system, a device, a method, or a computer readable media. Several embodiments of the present invention are described below.

In one embodiment, a method for enabling access to resources connected to client nodes of a network is disclosed. The method comprises establishing communication between a local client and a remote client. The local client establishes communication with the remote client by providing a remote client identification code and a password to the remote client using a DCOM enabled link. The communication is established when the remote client confirms that the remote client identification code and the password match. After communication is established, a determination is made if adapters are connected to the remote client and connection is established with a selected adapter connected to the remote client. Once a connection is established with the selected adapter, the local client is connected to the selected adapter. The selected adapter is configured to appear on a graphical user interface (GUI) of the local client as if the selected adapter of the remote client were physically connected to the local client.

In another embodiment, a method for accessing peripheral devices connected to a remotely located client on a network is disclosed. The method comprises configuring a local client and a remote client to allow for remote small computer system interface (SCSI) connectivity using a distributed component object model (DCOM) enabled link. The local client provides a remote client identification and a connection password to the remote client during the configuration operation in order to gain access to the remote client. Next, a determination is made if SCSI host adapters are connected to the remote client. If a determination is made that SCSI host adapters are connected to the remote client, a SCSI host adapter is selected. Once the SCSI host adapter is selected, the local client communicates with the selected SCSI host adapter. The local client accesses and uses the selected SCSI host adapter as if the selected SCSI host adapter belonged to the local client.

In still a further embodiment, a method for accessing resources connected to remotely located client nodes on a network is disclosed. The resources connected to the remotely located clients are displayed on a graphical user interface (GUI) of a local client. The method comprises a user first clicking on a remote client icon on the GUI of the local client to configure the local client and a remote client for remote small computer system interface (SCSI) connectivity. The user at the local client inputs a remote client identification and a password which allows access to the remote client using a distributed component object model (DCOM) enabled link. The method then determines if SCSI host adapters are connected to the remote client. After it is determined which SCSI host adapters are connected to the remote client, the user clicks on a SCSI host adapter icon on the GUI of the local client to access a SCSI host adapter which is remote from the local client. When the local client gains access to the SCSI host adapter, the local client communicates with the SCSI host adapter. The SCSI host adapter icon appears on the GUI of the local client as if the SCSI host adapter represented by the SCSI host adapter icon belonged to the local client.

The advantages of the present invention are numerous. Most notably, the embodiments of the present invention allow a client the ability to access a remote device as if the remote device was local to the client. Thus, this ability allows software from different clients to use the remote device as a source or destination transparently. For example, if two separate local clients contain software which writes data to CD-R's, the software on each local client may write data to a single CD-R located on a client which is remote from the separate local clients. The software on each local client will write data to the single CD-R of the remote client as if the single CD-R was on a device that is connected to each of the two local clients.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, and like reference numerals designate like structural elements.

DETAILED DESCRIPTION OF THE PREFERRED EMBODIMENTS

An invention for a method for accessing devices of remote clients on a network by a local client is disclosed. In the following description, numerous specific details are set forth in order to provide a thorough understanding of the present invention. It will be understood, however, to one skilled in the art, that the present invention may be practiced without some or all of these specific details. In other instances, well known process operations have not been described in detail in order not to unnecessarily obscure the present invention.

As an overview, the present invention uses a distributed component object model (DCOM), which is an extension of component object module (COM), to effectuate transfers between a local client and a remote client. DCOM is a set of Microsoft™ concepts and interfaces where a local client connected to a network may request services from a remote client also connected to the network. DCOM is a logical implementation that replaces the local interprocess communication provided by an operating system of a client with a network protocol. The network protocol allows direct connection between a local client and a remote client without the need for an intermediary system component. The present invention uses small computer system interface (SCSI) commands in conjunction with DCOM. The SCSI commands are encapsulated in packets which are suitable for DCOM and the packets are sent through the DCOM environment. For further information on DCOM processes, reference may be made to an article by Microsoft™ entitled "*DCOM Technical Overview*", (November 1996) by Microsoft™ Corporation of Redmond, Wash. This article is hereby incorporated by reference.

The present invention uses clients connected to a network. The network may be any type of network that allows for the interconnection of computers, such as local area networks (LANs), wide area networks (WANs), private networks, intranets, as well as the Internet (also known as the world wide web). The clients may be personal computers or any other networkable device that includes at least memory and a processor. As used herein, the clients are said to have loaded thereon client/server software which allows any one of the clients to operate as servers (e.g., to service a requesting client connected to the network). By way of example, a client may function as a server relative to a requesting client, such that the client/server software of the client is designed to provide a service to the requesting client. In a like manner, this requesting client can also function as a server when any client requests a service from the requesting client. For definitional purposes, a service may include providing a requesting client access to a peripheral device.

Figure 1:
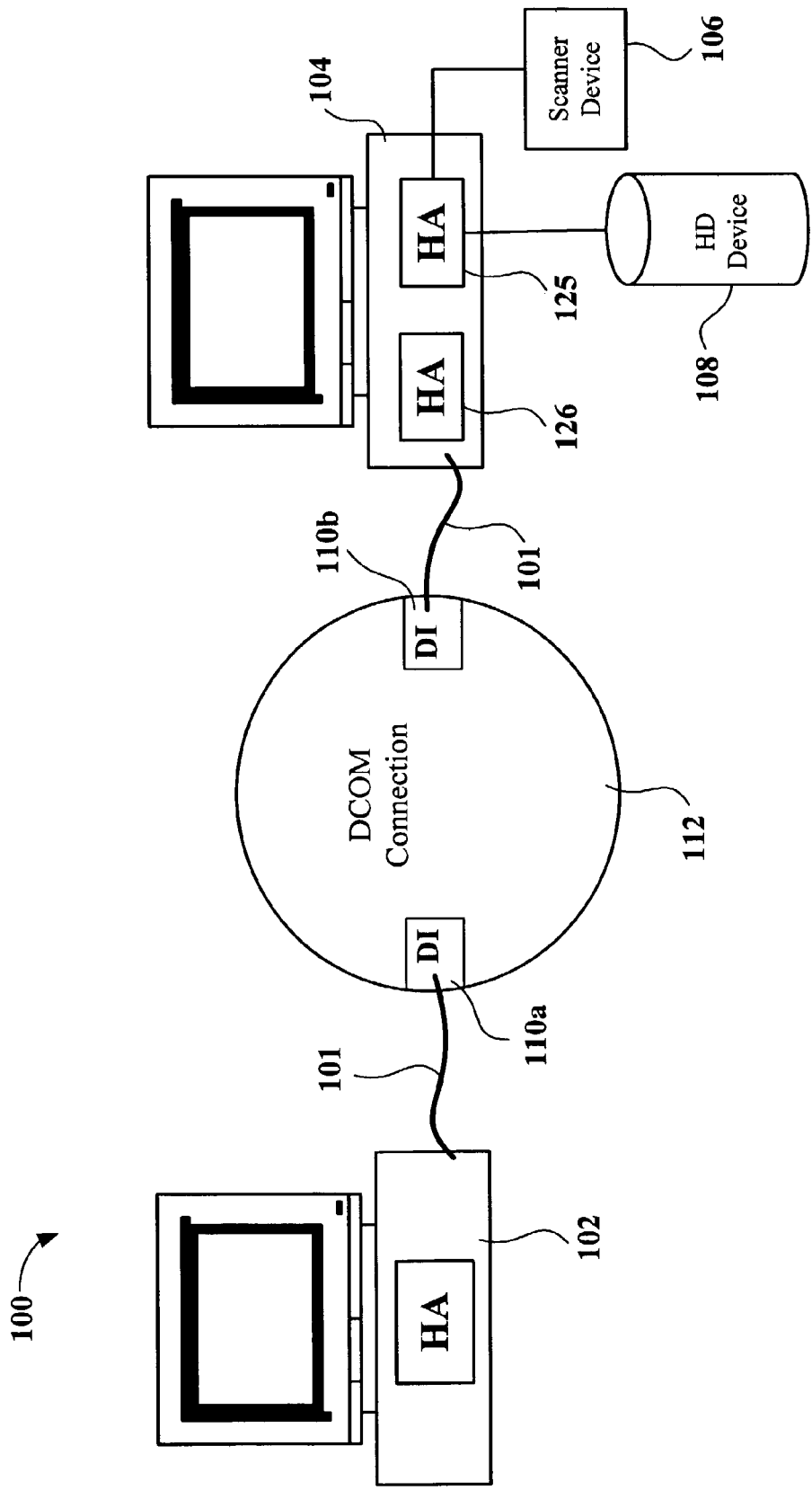
FIG. 1 shows a network having a local client connected to a remote client with a DCOM enabled link in accordance with one embodiment of the present invention.

Now making reference to the Figures and more particularly to FIG. 1, FIG. 1 shows a network 100 having a local client 102 connected to a remote server 104 with a DCOM enabled link 112, in accordance with one embodiment of the present invention. As used herein, the remote server 104 functions as a server which serves the local client 102 in one embodiment of the present invention. However, it should be noted that in other embodiments, the local client 102 may function as a server which services the remote server 104 where the remote server 104 is the client to the local client 102. Therefore, the local client 102 and the remote server 104 may both function as a server and a client. The local client 102 connects to the DCOM enabled link 112 with a connector 101. The local client 102 interfaces with the connector 101 using a network interface card (NIC), a modem, a DSL line, cable or the like. The connector 101 may be a cable, telephone line, or the like which allows connections between an end node, such as the local client 102, and a network. The connector 101 connects to the DCOM enabled link 112 with an interface 110a. The interface 110a may be any interface which facilitates connection between the client 102 and the DCOM enabled link 112, such as an IStream interface or the like. The DCOM enabled link 112 is the DCOM technology as previously described. The DCOM enabled link 112 also connects to the remote server 104.

The remote server 104 connects to the DCOM enabled link 112 with the connector 101 in the same manner as that described with respect to the local client 102. The remote server 104 includes host adapters 125 and 126 and the devices 106 and 108 connected to the host adapter 125. In accordance with one embodiment of the present invention, the device 106 may be a scanner device and the device 108 may a storage device, such as a hard drive or a RAID device. As will be further discussed with reference to FIGS. 3 and 4, the local client 102 accesses the devices 106 and 108 as if the devices 106 and 108 connected to the remote server 104 belong to the client 102.

In an alternative embodiment of the present invention, the local client 102 may function as a server as discussed earlier and the remote server 104 may be the client as mentioned earlier. In this context, the remote server 104 may access devices (not shown) connected to the local client 102 as if the devices connected to the local client 102 belong to the remote server 104. In order for the local client 102 to communicate with the remote server 104, the remote server 104 and the local client 102 must first establish a remote SCSI connection, as will be discussed with reference to FIG. 2A.

Figure 2A:
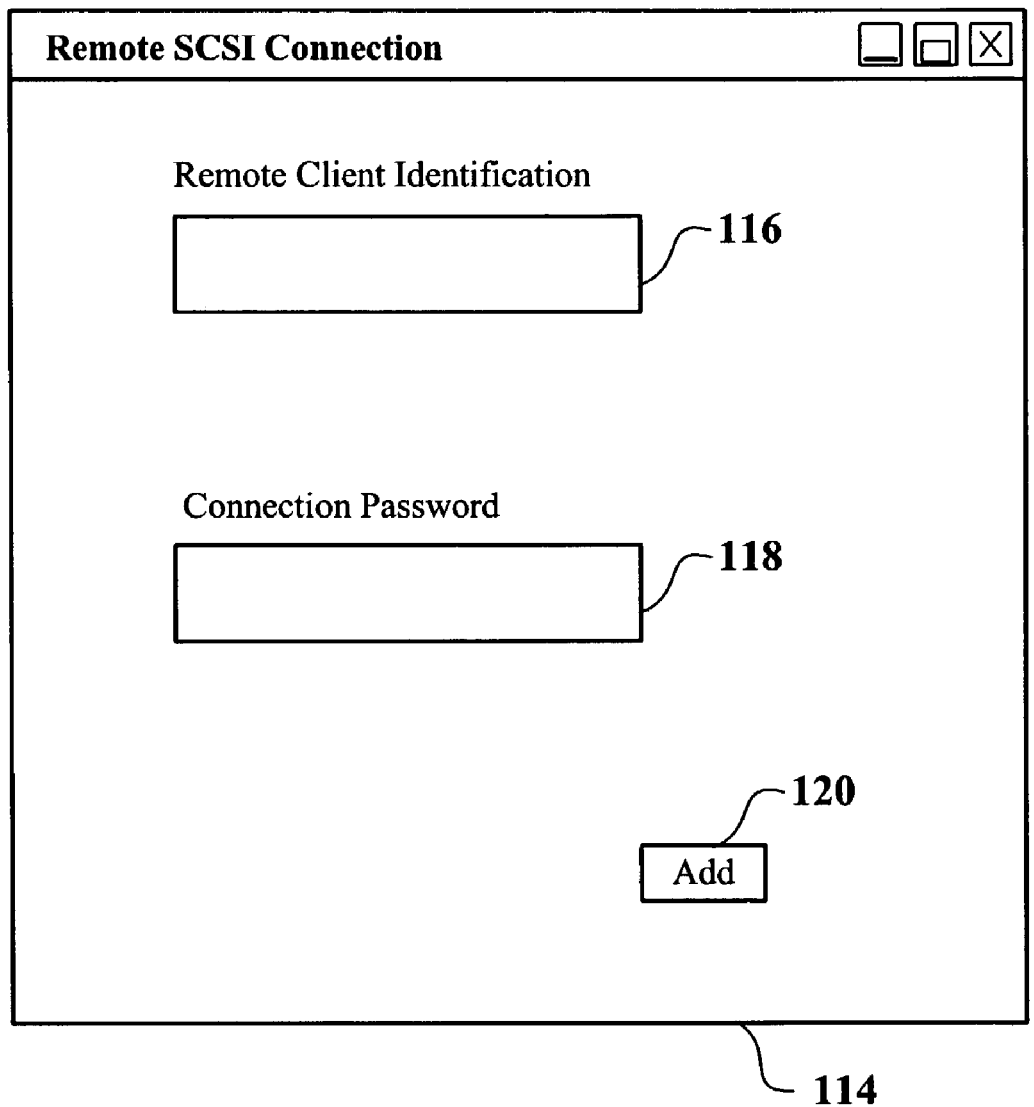
FIG. 2A shows a remote SCSI connection GUI having a remote client identification input and a connection password input in accordance with one embodiment of the present invention.

FIG. 2A shows a remote SCSI connection graphical user interface (GUI) 114 having a remote client identification input 116 and a connection password input 118 in accordance with one embodiment of the present invention. The GUI 114 allows for the establishment of a remote SCSI connection between the local client 102 and the remote server 104. If a user at the local client 102 wishes to communicate with the remote server 104, the user double clicks on the remote2 client icon 146 shown in FIG. 3. When the remote2 client icon 146 is double clicked, the remote SCSI connection GUI 114 appears on the local client 102 shown in FIG. 2A. The user then inputs a remote client identification specific to the local client 102, such as a URL, an IPaddress, a computer name in a LAN, or the like, at the remote client identification input 116. The user also inputs a password specific to the local client 102 in the connection password input 118. It should be noted that the remote server 104 learns the IPaddress and the connection password of the local client 102 and the local client 102 also learns the IPaddress and the password of the remote server 104 during a configuring operation as will be further discussed with reference to FIG. 4. In an alternative embodiment, if a user at the remote server 104 wishes to communicate with the local client 102, the user double clicks on a remoter client icon 144 in FIG. 3. After the client clicks on the remote1 client icon 144, the remote SCSI connection GUI 114 appears. The user then inputs a remote client identification specific to the remote server 104 and a password specific to the remote server 104. The remote SCSI connection GUI 114 also includes an add button 120. When the add button is clicked after the aforementioned information is input, a host adapter selection screen GUI 122 appears, as shown with reference to FIG. 2B.

Figure 2B:
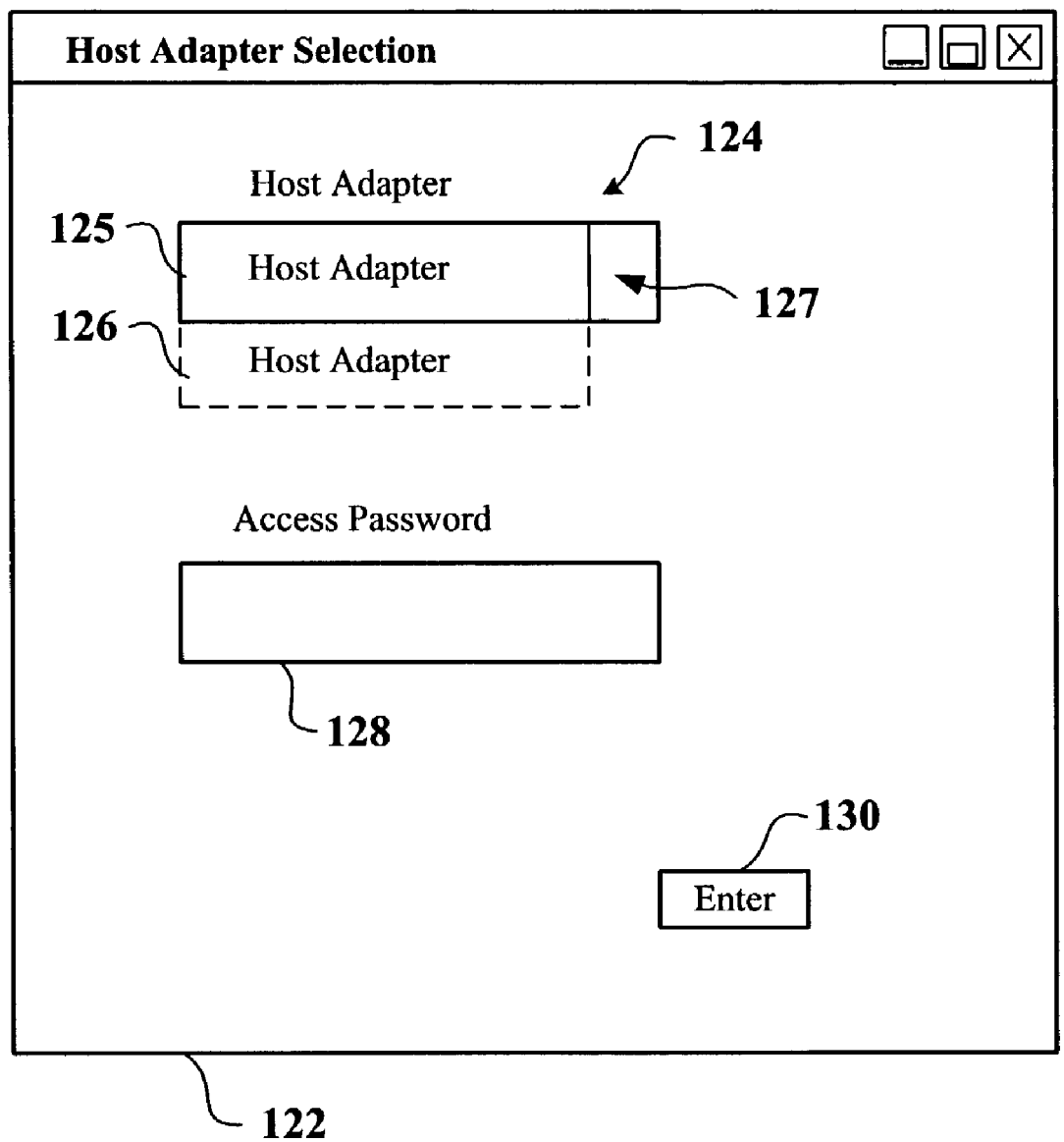
FIG. 2B shows a host adapter selection screen GUI in accordance with one embodiment of the present invention.

FIG. 2B shows the host adapter selection screen GUI 122 having a host adapter scroll bar 124 and an access password input 128 in accordance with one embodiment of the present invention. The host adapter screen GUI 122 also includes a scroll down button 127 and an enter button 130. The host adapter scroll bar 124 shows enumerated adapters which are attached to the remote server 104, which in this embodiment are the host adapters 125 and 126. The host adapters 125 and 126 are enumerated in this embodiment because the remote server 104 is functioning as a server. In an alternative embodiment where the local client 102 is functioning as a server and the remote server 104 is a client, the host adapter scroll bar 124 shows enumerated adapters which are attached to the local client 102.

Before a user may access a host adapter selected in the host adapter scroll bar 124, the user must provide a password at the access password input 128. In one embodiment, the password used for the access password input 128 is the same as the password used for the connection password input 118 of the remote SCSI connection GUI 114. Once a user at the local client 102 enters the password and clicks the enter button 130, the local client 102 is able to access peripheral devices attached to the remote server 104 as if the peripheral devices attached to the remote server 104 were attached to the local client 102, as shown with reference to FIG. 3.

Figure 3:
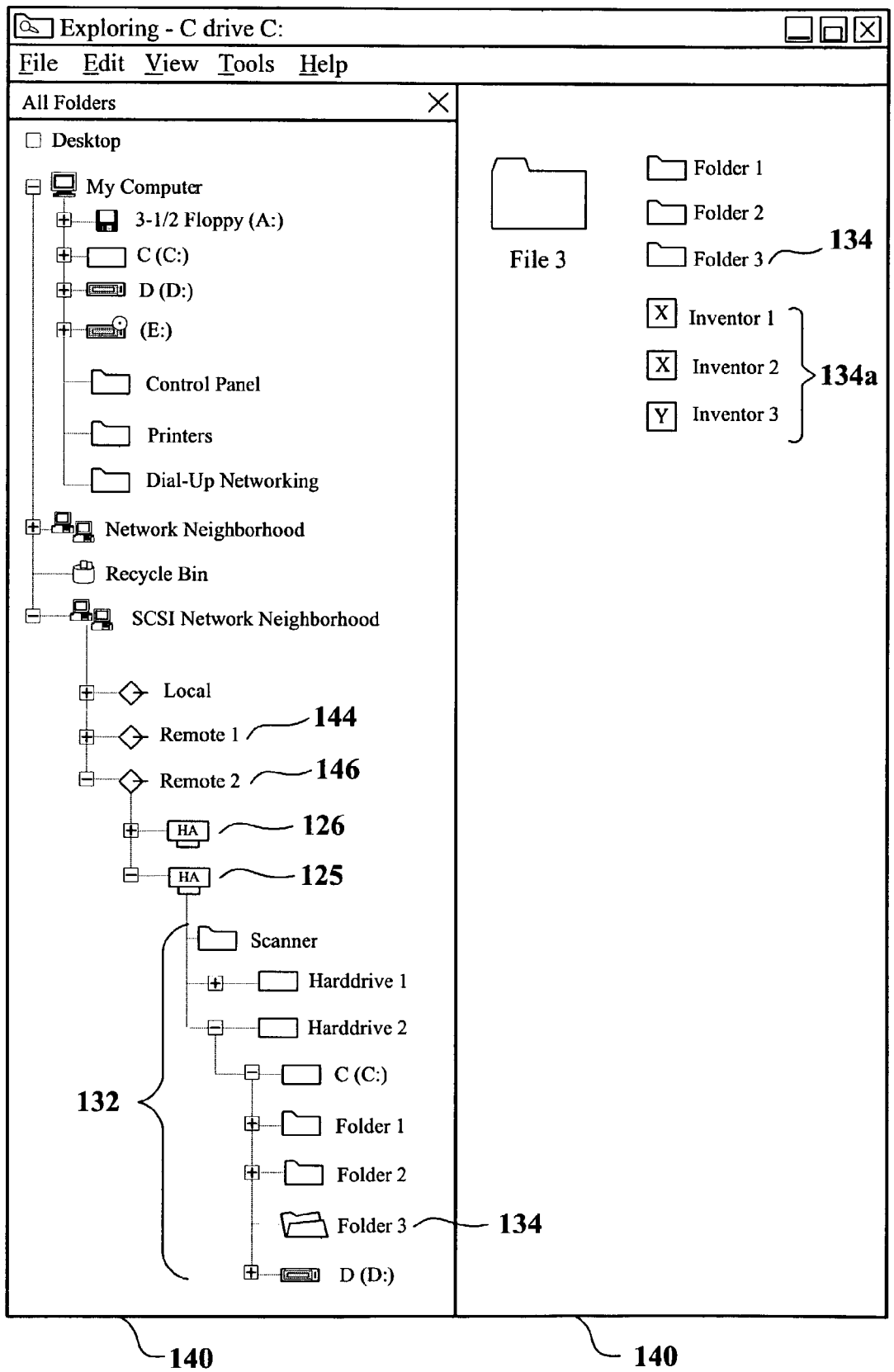
FIG. 3 illustrates a graphical user interface for a local client after the local client has accessed peripheral devices attached to a remote client, in accordance with one embodiment of the present invention.

FIG. 3 illustrates a GUI 140 for the local client 102 after the local client 102 has accessed peripheral devices attached to the remote server 104, in accordance with one embodiment of the present invention. In this embodiment, the host adapter 125 was selected in the host adapter selection screen GUI 122 of FIG. 2B. As a user on the local client 102 double clicks on the host adapter 125 icon in FIG. 3, contents 132 of the host adapter 125 are shown on the GUI 140 as if the contents 132 belonged to the local client 102. Thus, the user may access the contents 132 of the host adapter 125 which is remotely located on the remote server 104 as if the contents 132 were located on the local client 102. For example, folder3 134 may be opened to reveal files 134a on the local client 102. Therefore, a user on the local client 102 may edit the files 134a as if the files were physically located on the local client 102. In another embodiment, the contents of peripheral devices (not shown) connected to the local client 102 may be displayed on a GUI of the remote server 104 using the same procedure described above. In this embodiment, the remote server 104 may access files of peripheral devices connected to the local client 102 as if the peripheral devices were connected to the remote server 104.

Figure 4:
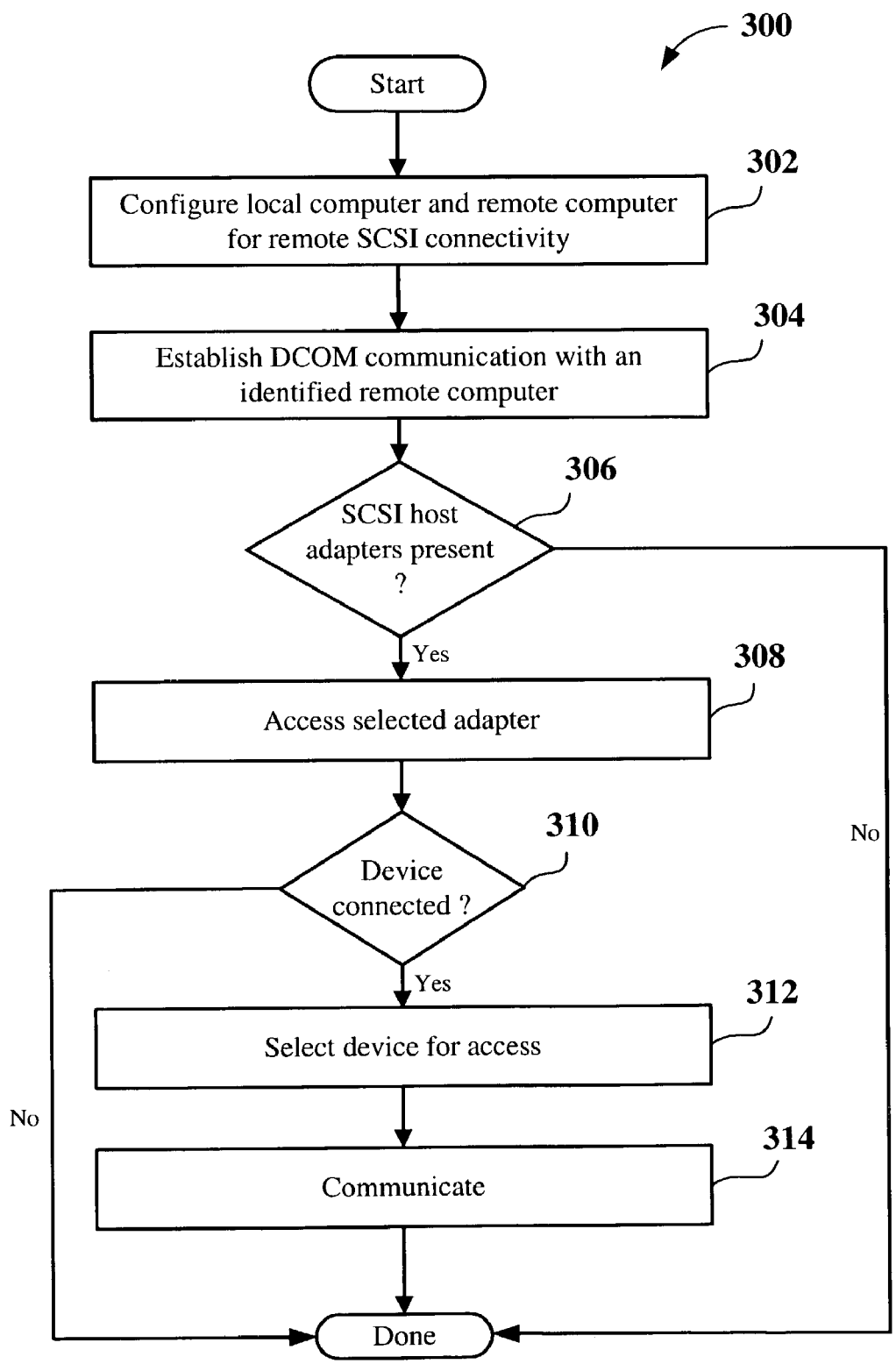
FIG. 4 shows a method for communications between a local client and a remote client.

FIG. 4 shows a method 300 for communications between a local client and a remote client. The method 300 starts with the operation 302 where a local computer and a remote computer are configured for remote SCSI connectivity. The configuration operation involves installing software on both the local computer and the remote computer which allows the local computer and the remote computer to interface with each other. The software may include the DCOM technology previously described. The operation 302 also includes establishing remote client identifications for the local computer and the remote computer and connection passwords and access passwords for both the local computer and the remote computer. For example, referring to FIG. 1 and the local client 102 and the remote server 104, software is loaded onto the local client 102 and the remote server 104 which allows remote SCSI connectivity between the local client 102 and the remote server 104. In addition, remote client identifications for the local client 102 and the remote server 104 are established along with connection and access passwords for the local client 102 and the remote server 104. In this example, the local client 102 is the client and the remote server 104 functions as the server as described above. It should be noted that the configuration operation 302 also allows a user on the remote server 104 to access peripheral devices connected to the local client 102 such that the local client 102 functions as a server and the remote server 104 is the client. Once the configuration is complete, operation 304 is performed.

In operation 304, a DCOM communication with an identified remote computer is established. In this operation, the client inputs the remote client identification established in the operation 302 along with the connection password. The client functioning as the server then checks to ensure that the proper remote client identification and connection password were input by the client. Turning back to the example and FIG. 3, the Remote2 client icon 146 is double clicked which brings up the remote SCSI connection GUI 114 in FIG. 2A on the local client 102. The user at the local client 102 then inputs the remote client identification for the local client 102 at the remote client identification input 116 and the connection password for the local client 102 in the connection password input 118. After the information is input by the user into the GUI 114, the user clicks on the add button 120 to add the local client 102 as a client to the remote server 104 when the remote client is functioning as a server. As described earlier, the local client 102 connects with the remote server 104 with the remote SCSI connection GUI 114 through the DCOM enabled link 112 as shown in FIG. 1. Thus, a DCOM enabled link is established between the local client 102 and the remote server 104 in operation 304. Once the operation 304 is complete, the method 300 moves to operation 306.

In operation 306, a determination is made if SCSI host adapters are connected with the identified remote computer. The determination is made using inquiry commands such as SCSI commands that determine if there are host adapters connected to the remote computer which is functioning as a server. If there are no host adapters connected to the remote computer, then the method 300 is complete. If there are host adapters connected to the remote computer, a host adapter is selected and then accessed by the local computer in operation 308. Turning back to the example and FIG. 2A, after the add button 120 is double clicked, the host adapter screen GUI 122 in FIG. 2B appears on the local client 102. In operation 306, an inquiry command is sent to the remote server 104 and a determination is made that the remote server 104 includes the host adapters 125 and 126. Once it is determined that the host adapters 125 and 126 exist, the user on the local client 102 may select which adapter to access by clicking the scroll button 127 and scrolling between the host adapters 125 and 126. In this example, the host adapter 125 is selected. After the host adapter 125 is selected, the user inputs the appropriate password at the access password input 128 in order to access the host adapter 125 in operation 308. It should be noted that the user on the local client 102 may also select the host adapter 125 by double clicking on the HA icon 125 in FIG. 3. When the user double clicks on the HA icon 125 in this example, the host adapter selection screen GUI 122 will appear. However, the user does not need to select the adapter 125 again in the host adapter area 124, instead the user inputs the password at the access password input 128. After the host adapter 125 is selected, operation 310 is performed.

In operation 310, a determination is made as to whether or not devices are connected to the selected adapter. If devices are not connected to the selected adapter, the method is complete. If devices are connected to the selected host adapter, operation 312 is performed where a device is selected for access. Referring to the example and FIG. 1, the operation 310 determines that the storage device 108 and the scanning device 106 are connected to the host adapter 125. After this determination is made, a device is selected in operation 312. A user at the local client 102 selects the storage device 108 connected to the host adapter 125 in operation 312. Once the user selects the storage device 108, the method 300 moves to operation 314 where the local client 102 communicates with the storage device 108. The local client 102 may access data stored on the storage device 108, such as specific applications, and operate those applications on the local client 102 as if the applications were stored on a device connected to the local client 102.

As can be seen, the embodiments of the present invention allow a user on a local client to view devices which are remotely located as icons on a GUI of the local client as if the devices belonged to the local client. The user may access the devices by simply double clicking on the icons and inputting a password and avoid having a user at the remote client sending data stored on the device. The data stored on the remotely located devices is easily accessible since accessing the data avoids the problems of the past where information stored on remote devices was first packaged into separate units and then sent via email or similar method.

Thus, in accordance with embodiments of the present invention, an item scanned using a scanner from a remote client could be read directly by the local client using the device without packing and sending the data.

The embodiments of the present invention also allow for multiple clients located on a DCOM network to function as servers and clients. A local client may be functioning as a client to a remote client by accessing information on devices connected to the remote client while at the same time the local client may be functioning as a server to a second remote client since the second remote client may access devices connected to the local client. Thus, using the present invention, many clients located on a network may access the devices of other clients. Nonetheless, security is maintained in that each client must provide a password prior to accessing devices connected to the client which is functioning as a server.

In addition, in accordance with one embodiment of the present invention, the accessed devices do not realize that a client other than the one to which the devices are attached is accessing the device. Instead, the devices think the remote client to which they are connected is accessing them. Therefore, access of the client will not be encumbered by the device since the device does not differentiate between the remote client to which the device is connected and the local client which is accessing the device.

The invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data, which can thereafter be read by a computer system. Examples of the computer readable medium include read-only memory, random-access memory, CD-ROMs, CD-Rs, CD-RWs, magnetic tapes, and other optical data storage devices. The computer readable medium can also be distributed over network coupled computer systems so that the computer readable code is stored and executed in a distributed fashion.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for accessing peripheral devices connected to a remotely located client on a network, the method comprising:

configuring a local client and a remote client, in a client/server architecture, for remote small computer system interface (SCSI) connectivity using a distributed component object model (DCOM) enabled link where the local client provides a remote client identification and a connection password to the remote client during the configuration operation;

determining if SCSI host adapters are connected to the remote client;

selecting a SCSI host adapter connected to the remote client; and communicating with the selected SCSI host adapter, where the local client accesses and uses the selected SCSI host adapter as if the selected SCSI host adapter belonged to the local client.

2. A method for accessing peripheral devices connected to a remotely located client on a network as recited in claim 1, wherein the remote client functions as a server such that the remote client provides services to the local client.

3. A method for accessing peripheral devices connected to a remotely located client on a network as recited in claim 1, wherein the local client functions as a server such that the local client provides services to the remote client.

4. A method for accessing peripheral devices connected to a remotely located client on a network as recited in claim 1, wherein the SCSI host adapters connected to the remote client are configured to appear on a graphical user interface (GUI) of the local client as if the SCSI host adapters belong to the local client.

5. A method for accessing peripheral devices connected to a remotely located client on a network as recited in claim 4, wherein the SCSI host adapters are configured as SCSI host adapter icons on the GUI of the local client.

6. A method for accessing peripheral devices connected to a remotely located client on a network as recited in claim 5, wherein selection of the SCSI host adapter is enabled by clicking on a SCSI host adapter icon on the GUI of the local client.

7. A method for accessing peripheral devices connected to a remotely located client on a network as recited in claim 1, wherein the operation of selecting the SCSI host adapter further comprises:

providing an access password to the remote client.

8. A method for accessing peripheral devices connected to a remotely located client on a network as recited in claim 1, wherein the local client provides the remote client identification and the connection password using a graphical user interface (GUI).

9. A method for accessing peripheral devices connected to a remotely located client on a network as recited in claim 7, wherein the local client selects the selected SCSI host adapter and inputs the access password using a graphical user interface (GUI).

10. A method for accessing resources connected to remotely located client nodes on a network, the resources being displayed on a first graphical user interface (GUI) of a local client, the method comprising:

clicking on a remote client icon on the GUI of the local client to configure the local client and a remote client for remote small computer system interface (SCSI) connectivity, in a client/server architecture, wherein the local client having a remote client identification and a connection password which allows access to the remote client using a distributed component object model (DCOM) enabled link;

determining if SCSI host adapters are connected to the remote client;

clicking on a SCSI host adapter icon on the GUI of the local client to access a SCSI host adapter, the SCSI host adapter being remote from the local client; and communicating with the SCSI host adapter, the SCSI host adapter icon appearing on the GUI of the local client as if the SCSI host adapter represented by the SCSI host adapter icon belonged to the local client.

11. A method for accessing resources connected to remotely located client nodes on a network as recited in claim 10, wherein the operation of clicking the SCSI host adapter icon to access the SCSI host adapter further comprises:

providing an access password to access the SCSI host adapter.

12. A method for accessing resources connected to remotely located client nodes on a network as recited in claim 11, wherein the access password is input using a third GUI which allows for host adapter selection.

13. A method for accessing resources connected to remotely located client nodes on a network as recited in claim 10, wherein the local client inputs the remote client identification and the connection password using a second GUI which allows for remote SCSI connection.

14. A method for accessing resources connected to remotely located client nodes on a network as recited in claim 10, wherein the local client communicates with the remote client using SCSI commands.

* * * * *